Figure 1:
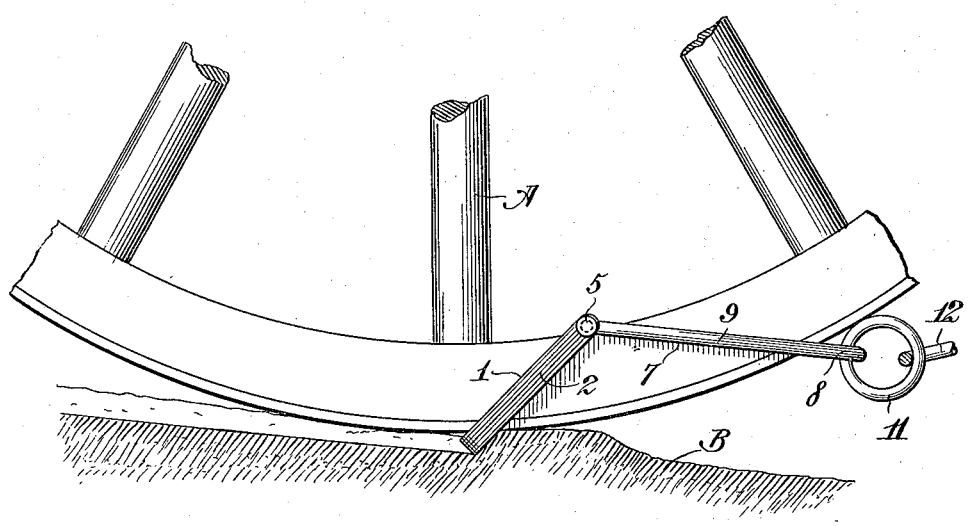

F. E. WINCHESTER.
WHEEL LOCK.
APPLICATION FILED DEC. 20, 1913.

1,156,197.

Patented Oct. 12, 1915.

Witnesses:
C. Heinle, Jr.,
Frederic W. Ely.

Inventor,
Fred E. Winchester.

UNITED STATES PATENT OFFICE.

FRED E. WINCHESTER, OF MANDERSON, WYOMING.

WHEEL-LOCK.

1,156,197.　　　　　Specification of Letters Patent.　　Patented Oct. 12, 1915.

Application filed December 20, 1913. Serial No. 807,942.

*To all whom it may concern:*

Be it known that I, FRED E. WINCHESTER, a citizen of the United States, residing at Manderson, in the county of Bighorn and State of Wyoming, have invented certain new and useful Improvements in Wheel-Locks; and I do hereby declare the following to be a full, clear, and exact description of the invention, such as will enable others skilled in the art to which it appertains to make and use the same.

This invention relates to certain novel and useful improvements in a device adapted to be applied to a vehicle wheel for the purpose of holding said wheel against rotation when the vehicle is descending a steep grade, and thereby prevent such vehicle running away down the incline.

In carrying out my invention, it is my purpose to provide a device which may be readily and quickly attached to the wheel of the vehicle in such manner that when the vehicle is descending the grade it will be held elevated slightly above the ground, and will not rotate, while the device itself, upon which the wheel will rest, will be dragged along the ground. Thus this device will act as a drag block or wheel lock, and will impede the travel of the vehicle to such an extent that it will not run forward upon the draft animal, or run away down the grade.

Still a further object of my invention is the provision of a device of this character which is composed of but relatively few parts, and these of such simple construction that they may be readily assembled and disassembled in applying and removing the device from the wheel.

I also aim to provide a device which will embody the desired features of simplicity, efficiency and reliability, and which may be manufactured and marketed at a relatively low cost.

With the above recited objects and others of a similar nature in view, my invention consists in the construction, combination and arrangement of parts set forth in and falling within the scope of the appended claim.

Figure 2:
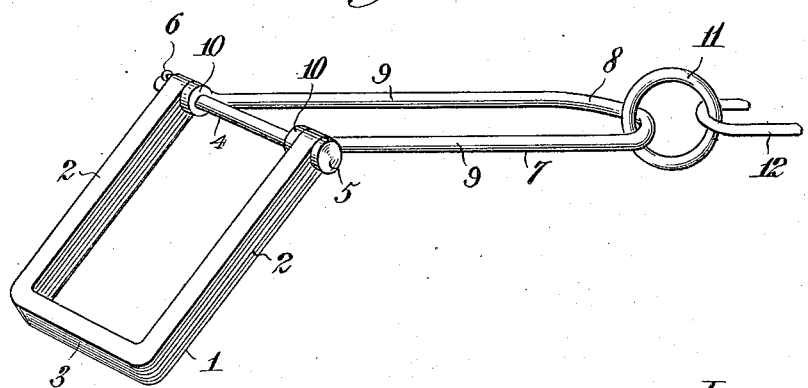

In the accompanying drawings: Figure 1 is a view in side elevation of a portion of a vehicle wheel, and showing my invention applied thereto. Fig. 2 is a perspective view of a device embodying my invention.

Referring now to the accompanying drawings in detail, the letter A designates so much of a vehicle wheel as is necessary to an understanding of the invention, the wheel being presumed to be descending a hill or grade B, as shown in Fig. 1.

My improved wheel lock or drag, as is shown in Fig. 2, comprises a U-shaped member 1 which is formed of suitable metal, and which is either square or rectangular in cross section, that is to say, the arms 2—2 and the cross bar 3 are formed with flat faces. The free ends of the arms 2—2 are perforated or bored transversely for the passage of the coupling pin 4 which is formed at one end with a head 5 and at the opposite end is bored for the passage of the cotter pin 6 which retains the coupling pin 4 in place.

The numeral 7 designates a relatively long U-shaped member preferably formed of round bar iron, and having a rounded or approximately semi-circular bight portion 8. The arms 9—9 of this member 7 are arranged in parallelism and terminate at their free ends in the circular enlargements 10 which are bored for the passage of the coupling pin 4. A coupling ring 11 is carried by the bight of the member 7, and to this coupling ring may be connected in any suitable manner the terminal link 12 of a chain, the other end of which chain is connected to any part of the wagon body, or running gear.

From the above description, taken in connection with the accompanying drawings, the construction and manner of employing my invention will be readily apparent.

When the device is to be applied, the member 1 is disconnected from the member 7 by withdrawing the coupling pin 4, and such member 1 is slipped on the felly of the wheel in a manner to stand the same as is shown in Fig. 1, so that the tire of the wheel will rest upon and bear against the top edge of the cross bar 3 of this member 1. The member 7 is then applied in a manner to span the wheel felly as shown in Fig. 1, and the coupling pin is used to connect the two members 1 and 7, and is held in place by the cotter pin 6. As the coupling pin 4 will extend across the inner periphery of the felly between two spokes, the device will be fast with the wheel. The drag chain is now connected, and as a forward pull takes place on the chain with the travel of the vehicle the member 7 will be pulled upward and forward against the wheel, while the member

1 will extend at a rearward inclination to the wheel and act as a drag scraping along the ground as the vehicle travels. The wheel, of course, resting as it does on the bar 3, cannot revolve, while at the same time the wheel and consequently the vehicle is held against lateral or side-wise movement or skidding, by the arms 2—2 of the member 1, and the arms 9—9 of the member 7. To disconnect the device it is only necessary to remove the coupling pin when such device will fall from the wheel.

It will be noted that I have provided an exceedingly simple, yet efficient device for preventing a wagon running away down a grade, especially such steep grades as are found in mountainous countries, and therefore, this device will be found exceedingly useful in avoiding injury or damage to the wagon, and accidents to the driver or occupants.

What I claim is:

A device of the class described, the combination of a U-shaped member adapted to span a wheel felly, and upon the cross bar of which member the wheel is adapted to rest, a second U-shaped member spanning the wheel felly forward of the first mentioned member, a removable coupling pin for detachably connecting the adjacent ends of the arms of the members, said pin being adapted to bear against the inner periphery of the wheel felly, and means for attaching a draft member to the second U-shaped member.

In testimony whereof, I affix my signature, in presence of two witnesses.

FRED E. WINCHESTER.

Witnesses:
R. B. CAVANAGH,
FRANK S. RATCLIFFE.

Copies of this patent may be obtained for five cents each, by addressing the "Commissioner of Patents, Washington, D. C."